(12) United States Patent
Yang et al.

(10) Patent No.: US 9,405,109 B2
(45) Date of Patent: Aug. 2, 2016

(54) OFF-AXIAL THREE-MIRROR OPTICAL SYSTEM WITH FREEFORM SURFACES

(71) Applicants: Tsinghua University, Beijing (CN); HON HAI PRECISION INDUSTRY CO., LTD., New Taipei (TW)

(72) Inventors: Tong Yang, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/726,687

(22) Filed: Jun. 1, 2015

(65) Prior Publication Data
US 2015/0346022 A1    Dec. 3, 2015

(30) Foreign Application Priority Data

Jun. 3, 2014   (CN) .......................... 2014 1 0241527

(51) Int. Cl.
*G02B 5/10*     (2006.01)
*G02B 17/06*    (2006.01)

(52) U.S. Cl.
CPC .................. *G02B 17/0642* (2013.01)

(58) Field of Classification Search
CPC ........... G02B 17/0642; G02B 17/0621; G02B 17/0626; H01L 27/14825
USPC .................... 359/850–851, 856–859; 250/216
See application file for complete search history.

(56) References Cited

U.S. PATENT DOCUMENTS

2010/0271691 A1*  10/2010  Sakagami .......... G02B 17/0642
                                                        359/351

* cited by examiner

*Primary Examiner* — James Phan
(74) *Attorney, Agent, or Firm* — ScienBiziP, P.C.

(57) ABSTRACT

An off-axial three-mirror optical system with freeform surfaces includes an aperture, a primary mirror, a secondary mirror, a tertiary mirror, and a detector. The aperture is located on an incident light path. The primary mirror is located on an aperture transmitted light path. The secondary mirror is located on a primary mirror reflected light path. The tertiary mirror is located on a secondary mirror reflected light path. The detector located on a tertiary mirror reflected light path. A primary mirror surface and a tertiary mirror surface have a same freeform surface equation, and the freeform surface equation is a sixth order x'y' polynomial. A secondary mirror surface is a tenth order aspherical surface.

19 Claims, 3 Drawing Sheets

OFF-AXIAL THREE-MIRROR OPTICAL SYSTEM WITH FREEFORM SURFACES

CROSS-REFERENCE TO RELATED APPLICATIONS

This application claims all benefits accruing under 35 U.S.C. §119 from China Patent Application No. 201410241527.3, field on Jun. 3, 2014 in the China Intellectual Property Office, disclosure of which is incorporated herein by reference. The application is also related to copending applications entitled, "OFF-AXIAL THREE-MIRROR OPTICAL SYSTEM WITH FREEFORM SURFACES", filed on Jun. 01, 2015, with application Ser. No. 14/726,684.

FIELD

The present disclosure relates to an off-axial optical system.

BACKGROUND

Compared with conventional rotationally symmetric surfaces, freeform surfaces have asymmetric surfaces and more degrees of design freedom, which can reduce the aberrations and simplify the structure of the system. In recent years, freeform surfaces are often used in off-axial three-mirror optical system.

However, conventional off-axial three-mirror optical systems with freeform surfaces are mostly applied to a small field of view, and F-number is large. In addition, a primary mirror, a secondary mirror, and a tertiary mirror in the off-axial three-mirror system are all freeform surfaces, and the primary mirror and the tertiary mirror are separate from each other; which makes the off-axial three-mirror optical systems are difficult to be assembled and fabricated.

BRIEF DESCRIPTION OF THE DRAWINGS

Implementations of the present technology will now be described, by way of example only, with reference to the attached figures.

DETAILED DESCRIPTION

Figure 1:
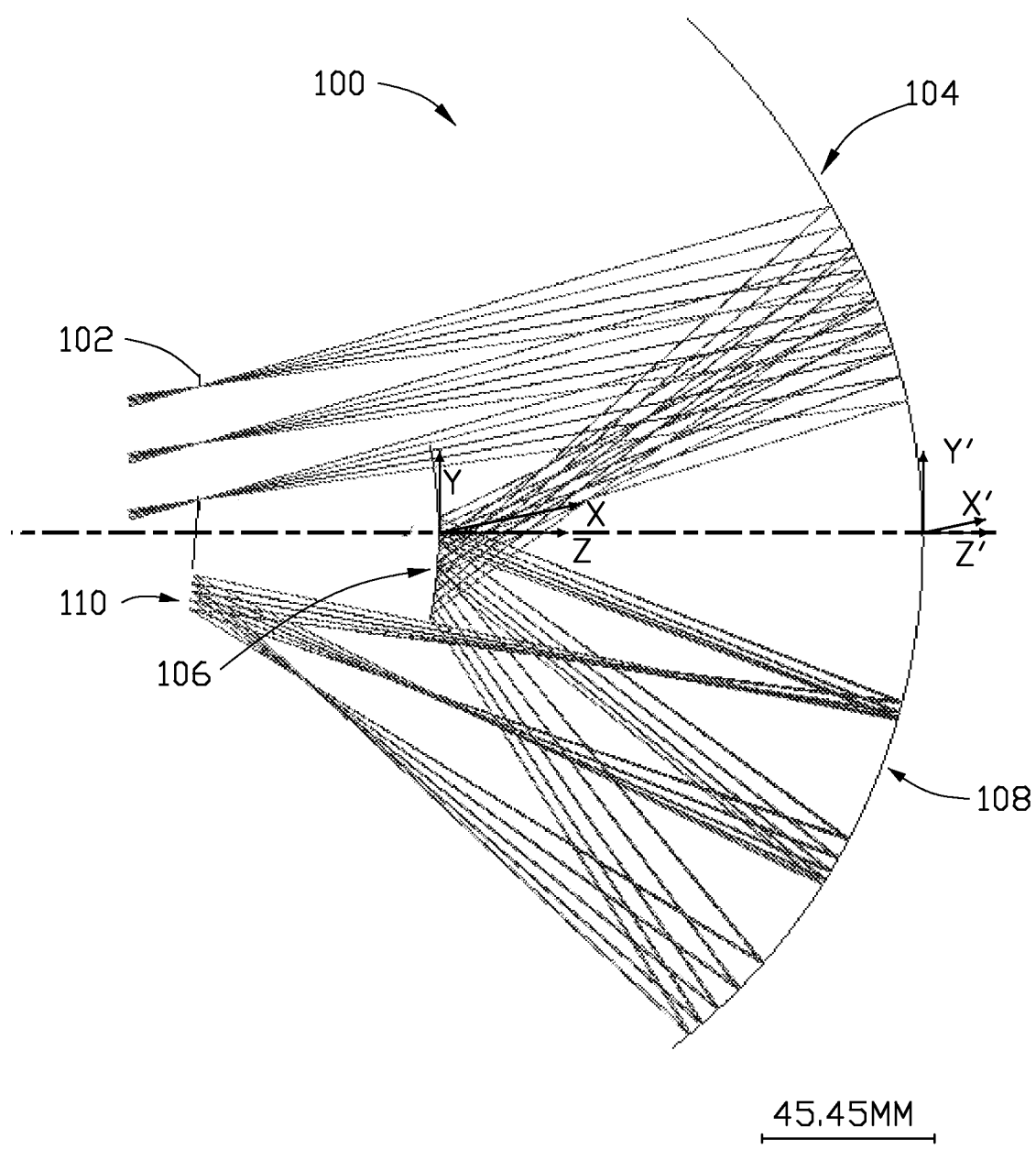
FIG. 1 is a schematic view of an off-axial three-mirror optical system with freeform surfaces configuration according to one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
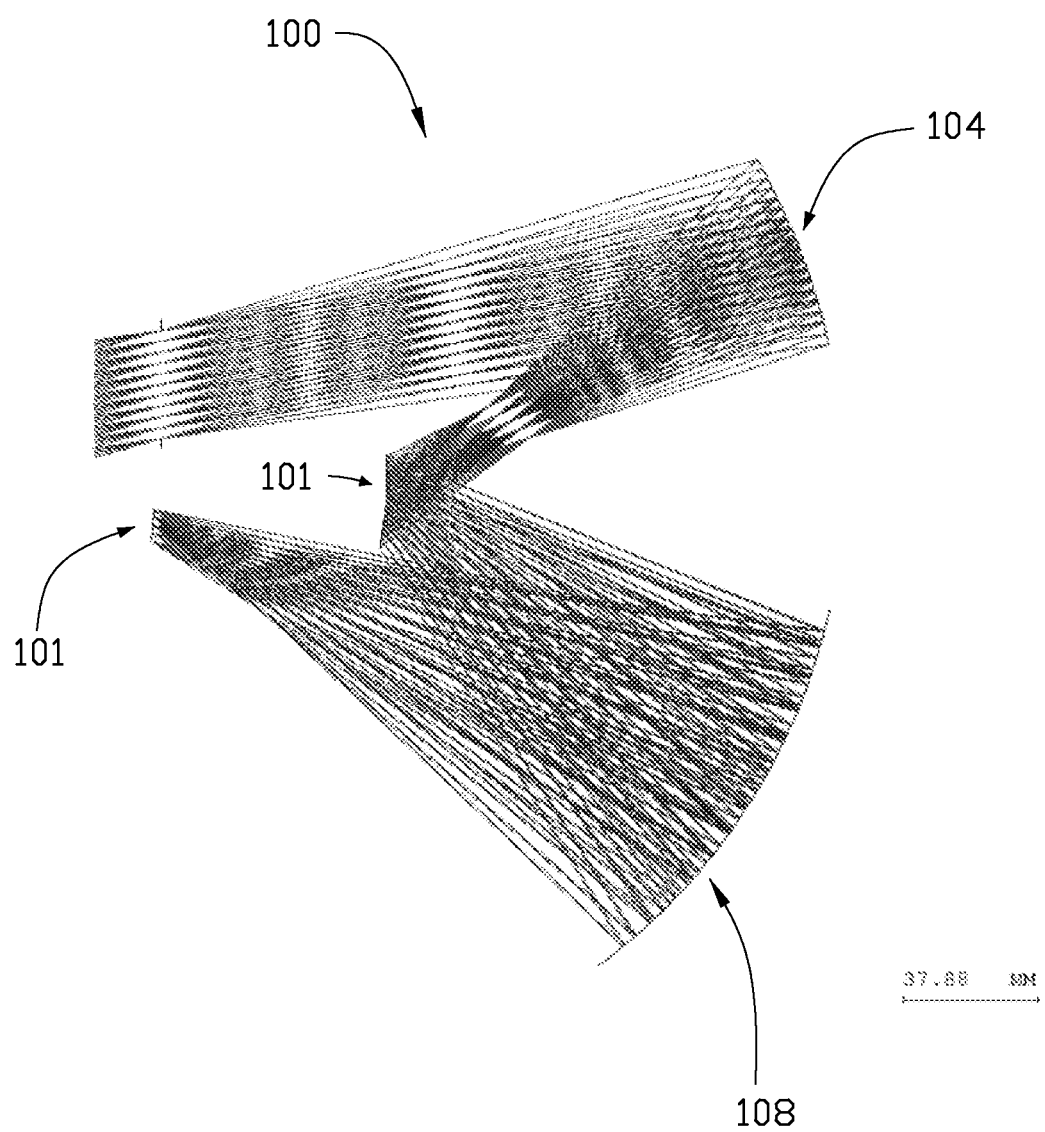
FIG. 2 is a schematic view of an off-axial three-mirror optical system with freeform surfaces light path according to one embodiment.

FIGS. 1-2 illustrate one embodiment of an off-axial three-mirror optical system with freeform surfaces 100 includes an aperture 102, a primary mirror 104, a secondary mirror 106, a tertiary mirror 108, and a detector 110. The aperture 102 and the primary mirror 104 are all located on an incident light path. The aperture 102 is used to control a diameter of incident lights; the secondary mirror 106 is located on a primary mirror reflected light path; the tertiary mirror 108 is located on a secondary mirror reflected light path; and the detector 110 is located on a tertiary mirror reflected light path. A primary mirror reflecting surface and a tertiary mirror reflecting surface are all freeform surfaces. The secondary mirror is an aspheric surface.

A light path of the off-axial three-mirror optical system with freeform surfaces 100 can be depicted as follows. Firstly, incident light transmits through the aperture 102 and reach the primary mirror 104, and is reflected by the primary mirror 104 to form a first reflected light $R_1$. Secondly, the first reflected light $R_1$ reaches the secondary mirror 106, and is reflected by the secondary mirror 106 to form a second reflected light $R_2$. Thirdly, the second reflected light $R_2$ reaches the tertiary mirror 108, and is reflected by the tertiary mirror 108 to form a third reflected light $R_3$. Finally, the third reflected light $R_3$ is received by the detector 110 and imaging.

A first three-dimensional rectangular coordinates system (X, Y, Z) is defined by a secondary mirror location. A secondary mirror vertex is a first three-dimensional rectangular coordinates system (X, Y, Z) origin. A horizontal line passing through the secondary mirror vertex is defined as a Z-axis, in the Z-axis, to the left is negative, and to the right is positive. A Y-axis is in a plane shown in FIG. 1, in the Y-axis, in a direction substantially perpendicular to the Z-axis, to the upward is positive, and to the downward is negative. An X-axis is perpendicular to a YZ plane, in the X-axis, in a direction substantially perpendicular to the YZ plane, to the inside is positive, and to the outside is negative. A second three-dimensional rectangular coordinates system (X', Y', Z') is defined by a primary mirror location and a tertiary mirror location. The second three-dimensional rectangular coordinates system (X', Y', Z') is obtained by moving the first three-dimensional rectangular coordinates system (X, Y, Z) along a Z-axis positive direction. A primary mirror vertex and a tertiary mirror vertex are all on the Z-axis of the first three-dimensional rectangular coordinates system (X, Y, Z).

The aperture 102 moves to the upward about 23.814 mm along a Y-axis positive direction relative to the Z-axis of the first three-dimensional rectangular coordinates system (X, Y, Z). A distance between an aperture center and the primary mirror vertex along the Z-axis positive direction is about 190.391 mm. A distance between the primary mirror vertex and the secondary mirror vertex along the Z-axis negative direction is about 127.370 mm. A distance between the secondary mirror vertex and the tertiary mirror vertex along the Z-axis positive direction is about 127.370 mm. A distance between the tertiary mirror vertex and a detector center along a Z-axis negative direction is about 192.740 mm. The detector center deviates the Z-axis about 15.252 mm along a Y-axis negative direction. An angle of the detector 110 and an XY plane long a counterclockwise direction is about 4.905°.

In the first three-dimensional rectangular coordinates system (X, Y, Z), a secondary mirror surface is a tenth order aspheric surface. A tenth order aspheric surface equation can be expressed as follows:

$$z(x, y) = \frac{c(x^2 + y^2)}{1 + \sqrt{1 - (1+k)c^2(x^2 + y^2)}} +$$
$$A(x^2 + y^2)^2 + B(x^2 + y^2)^3 + C(x^2 + y^2)^4 + D(x^2 + y^2)^5.$$

In the tenth order aspheric surface equation, z represents surface sag, c represents surface curvature, k represents quadratic surface coefficient, A is a forth order terms coefficient, B is a sixth order terms coefficient, C is a eighth order terms coefficient, and D is a tenth order terms coefficient.

In one embodiment, the values of c, k, A, B, C, and D in the tenth order aspheric surface equation are listed in TABLE 1. However, the values of c, k, A, B, C, and D in the tenth order aspheric surface equation are not limited to TABLE 1.

TABLE 1

| | |
|---|---|
| c | −0.00895443984561459 |
| k | −3.57767945275968 |
| A | −3.84499074982746e−007 |
| B | 4.67083454491926e−010 |
| C | −9.69906595912574e−013 |
| D | 6.21290835861807e−016 |

The second three-dimensional rectangular coordinates system (X', Y', Z') is obtained by moving the first three-dimensional rectangular coordinates system (X, Y, Z) for about 127.370 mm along a Z-axis positive direction. In other words, a distance between the first three-dimensional rectangular coordinates system (X, Y, Z) origin and a second three-dimensional rectangular coordinates system (X', Y', Z') origin is about 127.370 mm.

In the second three-dimensional rectangular coordinates system (X', Y', Z'), each of a primary mirror surface and a tertiary mirror surface is an x'y' polynomial freeform surface. An x'y' polynomial freeform surface equation can be expressed as follows:

$$z'(x', y') = \frac{c'(x'^2 + y'^2)}{1 + \sqrt{1 - (1+k')c'^2(x'^2 + y'^2)}} + \sum_{i=1}^{N} A_i' x'^m y'^n.$$

In the x'y' polynomial freeform surface equation, z' represents surface sag, c' represents surface curvature, k' represents quadratic surface coefficient, while $A_i'$ represents the ith term coefficient. Since the off-axial three-mirror optical system with freeform surfaces 100 is symmetrical about Y'Z' plane, even-order terms of x' can be only remained. At the same time, higher order terms will increase the fabrication difficulty of the off-axial three-mirror optical system with freeform surfaces 100. In one embodiment, the tertiary mirror surface is an x'y' polynomial freeform surface up to the sixth order without odd items of x'. A sixth order x''y'' polynomial freeform surface equation can be expressed as follows:

$$z'(x', y') = \frac{c'(x'^2 + y'^2)}{1 + \sqrt{1 - (1+k')c'^2(x'^2 + y'^2)}} + A_2' y' + A_3' x'^2 + A_5' y'^2 +$$
$$A_7' x'^2 y' + A_9' y'^3 + A_{10}' x'^4 + A_{12}' x'^2 y'^2 A_{14}' y'^4 + A_{16}' x'^4 y' +$$
$$A_{18}' x'^2 y'^3 + A_{20}' y'^5 + A_{21}' y'^6 + A_{23}' x'^4 y'^2 + A_{25}' x'^2 y'^4 + A_{27}' y'^6.$$

In one embodiment, the values of c', k', and $A_i'$ in the sixth order x'y' polynomial freeform surface equation are listed in TABLE 2. However, the values of c', k', and $A_i'$ in the sixth order x'y' polynomial freeform surface equation are not limited to TABLE 2.

TABLE 2

| | |
|---|---|
| c' | −6.52148121213E−03 |
| k' | −1.90703433664E−01 |
| $A_2'$ | −1.25188922628E−02 |
| $A_3'$ | 3.13950783971E−04 |
| $A_5'$ | 2.80905244675E−04 |
| $A_7'$ | 4.11370882829E−07 |
| $A_9'$ | −1.74715301561E−07 |
| $A_{10}'$ | 8.14056569005E−09 |
| $A_{12}'$ | 2.16121266846E−08 |
| $A_{14}'$ | 1.02733388844E−08 |
| $A_{16}'$ | 1.49405505239E−10 |
| $A_{18}'$ | 1.89803505851E−10 |
| $A_{20}'$ | 8.85940481886E−11 |
| $A_{21}'$ | 9.46110042538E−14 |
| $A_{23}'$ | 1.08096280577E−12 |
| $A_{25}'$ | 9.42814683556E−13 |
| $A_{27}'$ | 3.88927816143E−13 |

The materials of the primary mirror 104, the secondary mirror 106 and the tertiary mirror 108 can be aluminum, beryllium or other metals. The materials of the primary mirror 104, the secondary mirror 106 and the tertiary mirror 108 can also be silicon carbide, quartz or other inorganic materials. A reflection enhancing coating can also be coated on the metals or inorganic materials to enhance the reflectivity performance of the three mirrors. In one embodiment, the reflection enhancing coating is a gold film. A size of the primary mirror 104, the secondary mirror 106 and the tertiary mirror 108 can be designed according to need.

An off-axial three-mirror optical system with freeform surfaces effective entrance pupil diameter is about 30 mm.

The off-axial three-mirror optical system with freeform surfaces 100 adopts an off-axis field of view in a meridian direction. An off-axial three-mirror optical system with freeform surfaces field angle is about 6.4°×8°, wherein an angle in a sagittal direction is in a range from about −3.2° to about 3.2°, and an angle in the meridian direction is in a range from about 8° to about 16°.

An off-axial three-mirror optical system with freeform surfaces wavelength is not limited, in one embodiment, the off-axial three-mirror optical system with freeform surfaces wavelength is in a range from about 3 μm to about 12 μm.

An off-axial three-mirror optical system with freeform surfaces effective focal length (EFL) is about 64 mm.

An off-axial three-mirror optical system with freeform surfaces relative aperture (D/f) is about 0.469; and an off-axial three-mirror optical system with freeform surfaces F-number is a relative aperture(D/f) reciprocal, the F-number is about 2.13.

Figure 3:
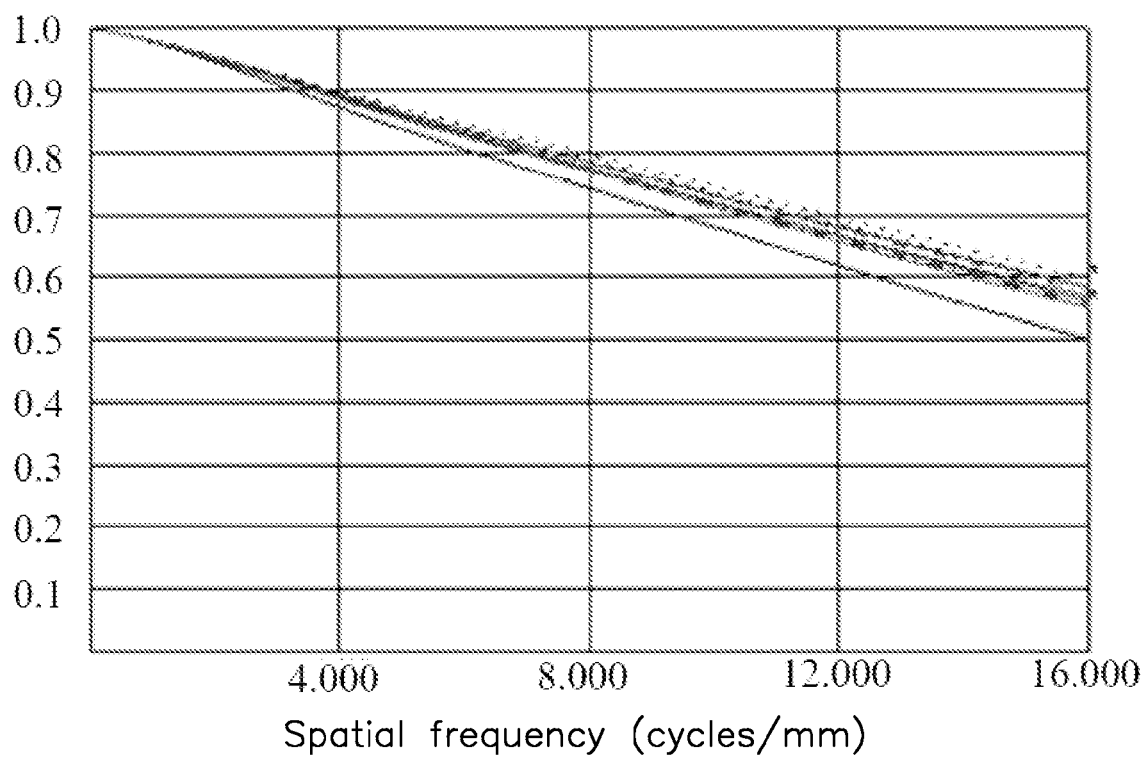
FIG. 3 is a graph showing modulation transfer function curves in long-wave infrared band of partial field angles of an off-axial three-mirror optical system with freeform surfaces according to one embodiment.

FIG. 3 illustrates off-axial three-mirror optical system with freeform surfaces modulation transfer functions (MTF) in long-wave infrared band of partial field angles are close to the diffraction limit. It shows that an off-axial three-mirror optical system with freeform surfaces imaging quality is high.

The off-axial three-mirror optical system with freeform surfaces 100 has many advantages as follows:

The off-axial three-mirror optical system with freeform surfaces 100 has larger field angle compared with coaxial three-mirror optical systems, the field angle is about 6.4°×8°; thereby enabling the off-axial three-mirror optical system with freeform surfaces 100 has larger rectangular field of view, and larger imaging range.

The primary mirror surface and the tertiary mirror surface are all freeform surfaces, compared with spherical or aspherical system, the off-axial three-mirror optical system with freeform surfaces 100 has more variables, which is conducive to correct aberrations, and obtain better imaging quality.

The off-axial three-mirror optical system with freeform surfaces 100 has smaller F-number and larger relative aperture, which allows more lights to enter the off-axial three-mirror optical system with freeform surfaces 100, and enables the off-axial three-mirror optical system with freeform surfaces 100 has higher input energy and limiting resolution.

Since the primary mirror surface and the tertiary mirror surface use the same freeform surface equation, it is no need to transform coordinate system and processing equation when machining the off-axial three-mirror optical system with freeform surfaces 100, and the primary mirror and the tertiary mirror can be processed on one element; thereby reducing processing difficulty.

A detection of the primary mirror and the tertiary mirror can only use a computer-generated hologram (CGH) component, which can simplify a detection process and reduce costs.

Since the secondary mirror 106 is a tenth order aspherical surface, the alignment difficulty is reduced, and the off-axial three-mirror optical system with freeform surfaces 100 is easy to be obtained.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. An off-axial three-mirror optical system with freeform surfaces comprising:
   an aperture located on an incident light path;
   a primary mirror located on the incident light path and configured to reflect incident lights transmitting through the aperture to form a first reflected light;
   a secondary mirror located on a first reflected light path and configured to reflect the first reflected light to form a second reflected light;
   a tertiary mirror located on a second reflected light path and configured to reflect the second reflected light to form a third reflected light; and
   a detector located on a third reflected light path and configured to receive the third reflected light;
   wherein a first three-dimensional rectangular coordinates system (X,Y,Z) is defined by a secondary mirror location, and a secondary mirror vertex is a first three-dimensional rectangular coordinates system (X,Y,Z) origin; a second three-dimensional rectangular coordinates system (X',Y',Z') is defined by a primary mirror location and a tertiary mirror location, and the second three-dimensional rectangular coordinates system (X',Y',Z') is obtained by moving the first three-dimensional rectangular coordinates system (X,Y,Z) along a Z-axis positive direction; a primary mirror surface and a tertiary mirror surface have a same freeform surface equation, and the freeform surface equation is an x'y' polynomial up to a sixth order; and a secondary mirror surface is an aspherical surface up to a tenth order.

2. The system as claimed in claim 1, wherein the x'y' polynomial up to the sixth order is:

$$z'(x', y') = \frac{c'(x'^2 + y'^2)}{1 + \sqrt{1 - (1+k')c'^2(x'^2 + y'^2)}} + A_2'y' + A_3'x'^2 + A_5'y'^2 + A_7'x'^2y' + A_9'y'^3 + A_{10}'x'^4 + A_{12}'x'^2y'^2 + A_{14}'y'^4 + A_{16}'x'^4y' + A_{18}'x'^2y'^3 + A_{20}'y'^5 + A_{21}'y'^6 + A_{23}'x'^4y'^2 + A_{25}'x'^2y'^4 + A_{27}'y'^6,$$

wherein, z' represents surface sag, c' represents surface curvature, k' represents quadratic surface coefficient, and $A_2'$~$A_{27}'$ represents coefficients.

3. The system as claimed in claim 2, wherein c'=−6.52148121213E-03, k'=−1.90703433664E-01, $A_2'$=−1.25188922628E-02, $A_3'$=3.13950783971E-04, $A_5'$=2.80905244675E-04, $A_7'$=4.11370882829E-07, $A_9'$=−1.74715301561E-07, $A_{10}'$=8.14056569005E-09, $A_{12}'$=2.16121266846E-08, $A_{14}'$=1.02733388844E-08, $A_{16}'$=1.49405505239E-10, $A_{18}'$=1.89803505851E-10, and $A_{20}'$=8.85940481886E-11, $A_{21}'$=9.46110042538E-14, $A_{23}'$=1.08096280577E-12, $A_{25}'$=9.42814683556E-13, and $A_{27}'$=3.88927816143E-13.

4. The system as claimed in claim 1, wherein the aspherical surface up to the tenth order is:

$$z(x, y) = \frac{c(x^2 + y^2)}{1 + \sqrt{1 - (1+k)c^2(x^2 + y^2)}} + A(x^2 + y^2)^2 + B(x^2 + y^2)^3 + C(x^2 + y^2)^4 + D(x^2 + y^2)^5$$

wherein, z represents surface sag, c represents surface curvature, k represents quadratic surface coefficient, A is a forth order terms coefficient, B is a sixth order terms coefficient, C is a eighth order terms coefficient, and D is a tenth order terms coefficient.

5. The system as claimed in claim 4, wherein c=−0.00895443984561459, k=−3.57767945275968, A=−3.84499074982746e-007, B=4.67083454491926e-010, C=−9.69906595912574c-013, and D=6.21290835861807c-016.

6. The system as claimed in claim 1, wherein the aperture moves to upward about 23.814 mm along a Y-axis positive direction relative to a Z-axis of the first three-dimensional rectangular coordinates system (X,Y,Z).

7. The system as claimed in claim 6, wherein a distance between an aperture center and a primary mirror vertex along the Z-axis positive direction is about 190.391 mm.

8. The system as claimed in claim 1, wherein a distance between a primary mirror vertex and the secondary mirror vertex along a Z-axis negative direction is about 127.370 mm.

9. The system as claimed in claim 1, wherein a distance between the secondary mirror vertex and a tertiary mirror vertex along the Z-axis positive direction is about 127.370 mm.

10. The system as claimed in claim 1, wherein a distance between a tertiary mirror vertex and a detector center along a Z-axis negative direction is about 192.740 mm.

11. The system as claimed in claim 1, wherein a detector center deviates a Z-axis about 15.252 mm along a Y-axis negative direction.

12. The system as claimed in claim 1, wherein an angle between the detector and an XY plane of the first three-dimensional rectangular coordinates system (X,Y,Z) along a counterclockwise direction is about 4.905°.

13. The system as claimed in claim 1, wherein a field angle is about 6.4°×8°.

14. The system as claimed in claim 13, wherein an angle in a sagittal direction is in a range from about −3.2° to about 3.2°.

15. The system as claimed in claim 13, wherein an angle in a meridian direction is in a range from about 8° to about 16°.

16. The system as claimed in claim 1, wherein a relative aperture is about 0.469; and an F-number is about 2.13.

17. The system as claimed in claim 1, wherein an effective entrance pupil diameter is about 30 mm.

18. The system as claimed in claim 1, wherein an effective focal length is about 64 mm.

19. An off-axial three-mirror optical system with freeform surfaces comprising:
an aperture located on an incident light path;
a primary mirror located on an aperture transmitted light path;
a secondary mirror located on a primary mirror reflected light path;
a tertiary mirror located on a secondary mirror reflected light path; and
a detector located on a tertiary mirror reflected light path;
wherein a secondary mirror surface is an aspherical surface up to a tenth order; a primary mirror surface and a tertiary mirror surface have a same freeform surface equation, the freeform surface equation is an x'y' polynomial up to a sixth order, and the x'y' polynomial up to a sixth order is:

$$z'(x',y') = \frac{c'(x'^2+y'^2)}{1+\sqrt{1-(1+k')c'^2(x'^2+y'^2)}} + A'_2 y' + A'_3 x'^2 + A'_5 y'^2 + A'_7 x'^2 y' + A'_9 y'^3 + A'_{10} x'^4 + A'_{12} x'^2 y'^2 + A'_{14} y'^4 + A'_{16} x'^4 y' + A'_{18} x'^2 y'^3 + A'_{20} y'^5 + A'_{21} y'^6 + A'_{23} x'^4 y'^2 + A'_{25} x'^2 y'^4 + A'_{27} y'^6,$$

in the x'y' polynomial up to a sixth order, z' represents surface sag, c' represents surface curvature, k' represents quadratic surface coefficient, and $A_2'$~$A_{27}'$ represents coefficients.

* * * * *